United States Patent

Bickford et al.

[15] 3,646,443

[45] Feb. 29, 1972

[54] MULTIAPERTURE RECEIVING AND TRANSMITTING SYSTEM

[72] Inventors: William J. Bickford, Weston; Joseph T. De Bettencourt, West Newton; James F. Roche, Dedham; Howard J. Rowland, Newton Highlands, all of Mass.

[73] Assignee: Raytheon Company, Lexington, Mass.

[22] Filed: Oct. 1, 1968

[21] Appl. No.: 764,094

[52] U.S. Cl. ................................325/56, 325/305, 325/307, 325/372, 325/369

[51] Int. Cl. ..........................................................H04b 7/04

[58] Field of Search....................325/56, 154, 305, 307, 372, 325/369; 343/200, 205, 208

[56] References Cited

UNITED STATES PATENTS

| | | | |
|---|---|---|---|
| 3,482,165 | 12/1969 | Leming | 325/56 |
| 3,471,788 | 10/1969 | Bickford et al. | 325/369 |
| 3,462,554 | 8/1969 | Steel, Jr. | 325/56 |

*Primary Examiner*—Robert L. Griffin
*Assistant Examiner*—Albert J. Mayer
*Attorney*—Harold A. Murphy and Joseph D. Pannone

[57] ABSTRACT

A multiaperture receiving and transmitting system using predetection signal combining which provides the same aperture with a multielement antenna system as will the use of a single large aperture. The multiplicity of apertures for the transmitter permits multiplexing of RF carriers side-by-side in the same radio channel assignment. In the receiver portions of the system with N apertures and one transmitter per aperture, predetection combining permits reception of each signal on N apertures.

3 Claims, 2 Drawing Figures

RADIO CHANNEL

INVENTORS
WILLIAM J. BICKFORD
JOSEPH T. de BETTENCOURT
JAMES F. ROCHE
HOWARD J. ROWLAND
BY Irving S. Rappaport
ATTORNEY

MULTIAPERTURE RECEIVING AND TRANSMITTING SYSTEM

BACKGROUND OF THE INVENTION

Prior art receiving and transmitting systems as are used in troposcatter links and line-of-sight systems generally provide a single large aperture which results in substantial coupling losses and requires tremendous power capabilities. A characteristic of troposcatter links is a narrow transmission bandwidth resulting from multipath which greatly limits the information rate. Line-of-sight systems are subject to fading. Such prior art systems employ a single aperture thereby limiting the channel handling capability of the system and transmission reliability and availability is seriously affected.

The receiving and transmitting system of the present invention provides the same aperture with a multielement antenna system as is provided by using a single large aperture. The use of multiapertures results in a great reduction of coupling losses and permits multiplexing of RF carriers side by side in the same radio channel assignment. This provides effective use of the radio spectrum and permits a significant increase in transmitter power over one transmitter by the use of many identical transmitters of one design rather than redesigning the transmitter to handle many times the power. In the receiver portions of the system, the multiplicity of apertures accepts many signals from each transmitter. Stated numerically, there are "N" apertures and one transmitter per aperture, and with predetection combining each signal is received on N apertures. If single transmitter and receiver apertures of the same size are used for a reference, the multiaperture techniques provide an $N^2$ improvement in performance. Thus, 10 apertures can be used to provide 20db. improvements.

The invention of the present system yields a highly reliable and high capacity receiving and transmitting system without undue spectrum costs. The approach of the present invention suggests that, at the sending site, the number of channels per transmitter be reduced to a value that the medium and the combining technique supports. As an example, for long troposcatter hops in the 400 mile class, this number may be no more than 12 voice bands probably. The total capacity is N voice channels times K transmitters. The receiving site diversity can be of the order K if there are as many apertures as transmitters, or of higher order if the desired total aperture is more K times the individual aperture. Such a system has the following features and advantages as well as others: (1) The total power can exceed the superpower single carrier design; (2) There is no need for superpower component engineering; (3) The total traffic is the sum of many carriers and, for a given channel bandwidth, the long-haul capacity will increase. For multicarrier FM through a limiting satellite, it has been shown that more channels can be sent by this technique than by a single carrier approach. This system does not have a medium that limited the transmission bandwidth; (4) The high order diversity permits excellent transmission reliability; (5) The system reliability is such that a failure of one transmitter reduces the trunk capacity by 1/K. The loss of one receiver chain reduces the order of diversity by one. Thus, the equipment and transmission availability will be excellent.

An excellent application of the present invention is long distance troposcatter links. By having a multiplicity of N transmitters, the amount of information transmitted increases N times, as each is limited in bandwidth by the same degree. With N signals available at the receiver from each transmitter, by employing predetection combining multipath is reduced and transmission reliability is improved. The multiaperture techniques can be utilized in troposcatter links using one reflector whenever multiple feeds can be incorporated in the antenna design. The multiaperture features are equally usable in line-of-sight systems. When fading is present, the multiple apertures provide protection via space diversity.

SUMMARY OF THE INVENTION

A multiaperture receiving and transmitting system comprising transmitting means including a plurality of apertures and receiving means including a plurality of apertures, each receiving aperture having a predetection combining means coupled thereto, whereby the transmitting apertures permit multiplexing of RF carriers side by side in the same channel and each transmitted signal is received on each of the receiving apertures.

DESCRIPTION OF THE PREFERRED EMBODIMENTS

Figure 1:
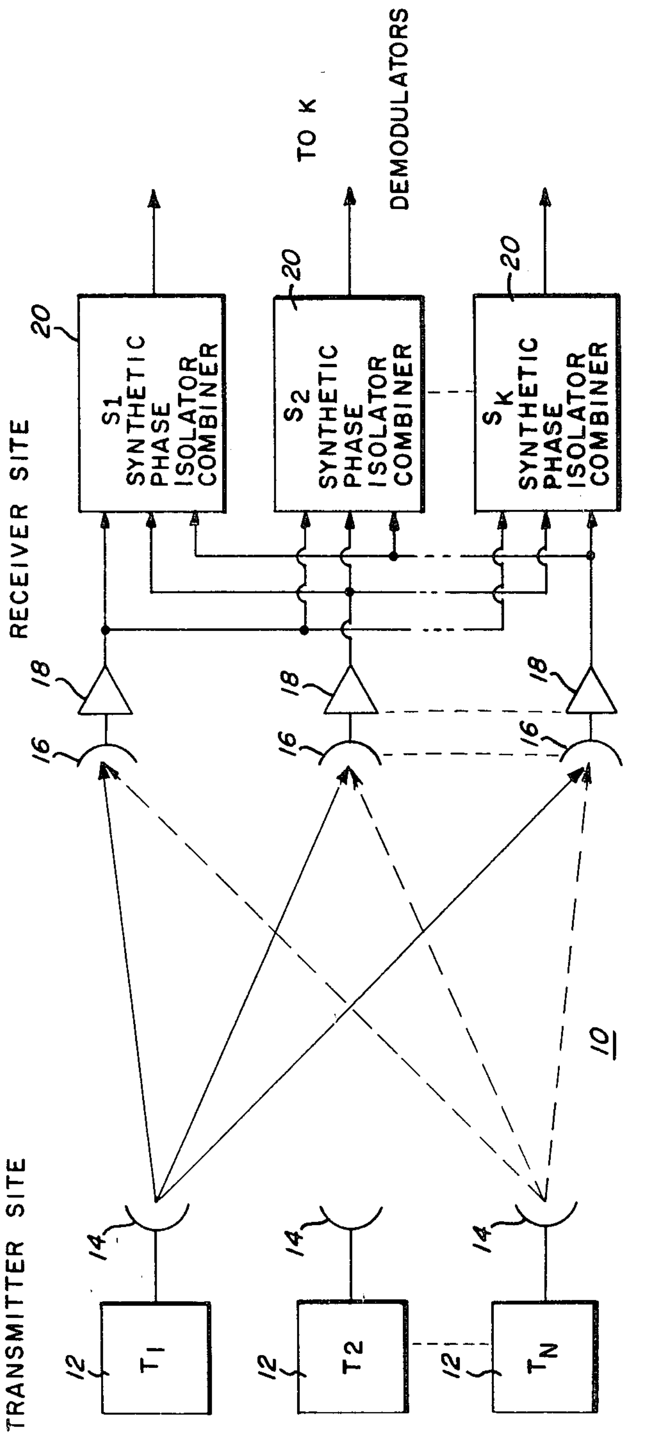
FIG. 1 is a block diagram of the system of the present invention.

FIG. 1 shows a block diagram of a multiaperture receiving and transmitting system 10. The system 10 includes a transmitter site having a plurality of N transmitters 12 ($T_1, T_2 ... T_N$) each having an antenna 14 associated therewith. Each of the transmitted signals are received at the receiver site. The signals from each of the transmitters 12 are received at K antennas 16. As shown, each of the K antennas 16 receives the signals from every transmitter 12 ($T_1, T_2 ... T_N$). Each of the signals received by antennas 16 are amplified by associated amplifiers 18. The output from each amplifier 18 is fed in parallel to a plurality of K predetection signal combiners 20 ($S_1, S_2 ... S_K$). The output from each combiner 20 is applied to a demodulator.

The predetection signal combiners 20 are synthetic phase isolators. It is frequently desirable to combine signals arriving at two or more points in a manner which provides maximum signal power to a load. However, it is usually difficult to process these signals so as to provide maximum signal power to the load. This is due in part to the fact that phase relationships of the mean frequencies of a given spectrum or the carriers of the incoming signals are generally independent of each other. The addition, therefore, of the two or more of such signals provides an output whose amplitude is dependent upon the vector sum of the incoming signals and results in an output varying as a function of the phase and amplitude relationships of the incoming signals. For example, when the signals obtained from each of the plurality of antennas 16 are added, the power transfer therefrom depends upon the relative location of each antenna with antenna with respect to the transmitting source. Also, in an antenna array, the spacing of elements becomes important as does the spacing of transducers in an acoustical array. In other instances, the transmission medium may change to bring about undesirable phase differences in the incoming signals to be combined. While under certain conditions phase discrepancies may be corrected to permit maximum signal power transfer to the load, which in some instances may be a diversity receiver, in other cases the transmitting medium and direction of the source may vary in a manner such that phase correction becomes difficult, if not impossible, to achieve.

It is therefore desirable to combine separate signals of differing phase to achieve maximum power transfer to a load, irrespective of the phase relationships of the incoming signals. It is also desirable to combine modulated signals from a common source to achieve maximum power output when such signals are received by a plurality of antenna elements. In other instances, it is required that signals from a plurality of antenna elements be combined in an efficient manner when frequency diversity transmission is employed. Finally, it may be desirable to combine in an efficient manner individual signals which contain the same information when received irrespective of the transmission or receiving medium.

In the past, it has been customary to provide postdetection combining processes in an effort to achieve the above-recited signal translation functions and at the same time minimize the reception of noise. However, when the predetection signal to noise ratio is such that noise degrades the detection process, postdetection combining, this is combining said signals after detection, no longer yields maximum signal power. Predetection combining can be used to avoid the undesirable results associated with postdetection combining.

Therefore, the predetection combiners 20 utilize synthetic phase isolators to provide an improved signal processing system in which the phase differences associated with the incoming signals are effectively compensated or rendered negligible so as to provide output signals of like phase which are particularly suited for predetection combining and are substantially independent of the phase of the incoming signals.

In the synthetic phase isolators, the input signals from the plurality of antennas 16, which have unknown an varying phase relationships relative to each other, are heterodyned with another signal, for example, a local oscillator to produce pairs of beat frequency signals having phase components which bear a fixed relationship to the phase of the corresponding input signals. One signal of each pair of signals produced by this first heterodyne process is beat with its corresponding input signal to provide pairs of beat frequency signals having phase components substantially in phase opposition to each other. Means are provided for combining the latter signals to provide a combined output signal having a phase substantially independent of the phase of the input signals.

This combined output signal provided by this second heterodyning process is then used as the heterodyning signal in the first heterodyning signal in the first heterodyning process, thus providing a regenerative feedback loop. Thus, by mixing the output signal prior to detection with the input signal, the input signal carrier and sidebands mix with the output signal carrier and sidebands to provide a heterodyne signal, the energy of which is primarily restricted to a single center frequency having an amplitude which is greater than that provided by mixing the same input signal with that of an unmodulated local oscillator. Since the two signals to be mixed are substantially identical except for a displacement in frequency, the energy at the center, or beat frequency, is substantially greater and less energy is present in the form of sidebands. Such process in which the beat frequency signal is mixed by the undetected output may be referred to as a correlation process which provides optimum energy at a single frequency. A more detailed description of a synthetic phase isolator may be found in the copending application by William J. Bickford and Howard J. Rowland, U.S. Pat. No. 3,471,788 entitled, Predetection Signal Processing System filed on July 1, 1966.

FIGS. 1, 2, 3, 5 and 6 of the said Bickford et al. U.S. Pat. 3,471,788 in particular may be utilized as the predetection combiners 20 and a description of these portions of the incorporated patent may be found therein. More particularly, the antennas of FIGS. 1, 2, 3, 5 and 6 of the incorporated Bickford et al. patent are not included within the synthetic phase isolator combiner 20 of the instant invention, but rather are included in antennas 16. For example, antenna 16 is functionally identical to either antenna 10 or antenna 12 of the Bickford et al. system of FIGS. 1 or 2.

Although the predetection combiners 20 are synthetic phase isolators other predetection combiners which are capable of handling more than 2 or 3 inputs could be utilized.

Figure 2:
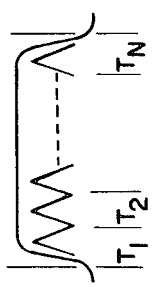
FIG. 2 is a graph of the signal capabilities of the present invention.

By employing a multiplicity of apertures via the transmitters 12 and antennas 14, multiplexing of RF carriers side by side in the same radio channel is permitted as seen in FIG. 2. This capability provides effective use of the radio spectrum and permits a significant increase in transmitter power over a single transmitter. By utilizing a multiplicity of apertures via the receiving antennas 16 and synthetic phase isolating combiners 20 each transmitted signal is received on each of the receiving antennas 16. If there are N transmitting apertures and N receiving apertures all of the same size, the multiaperture technique of the present invention provides an $N^2$ improvement in performance. For example, ten apertures can be used to provide 20db. improvements.

In FIG. 1 it should be understood that there may be an equal or unequal number of transmitting and receiving antennas 14 and 16 respectively. Therefore, K may be equal to or unequal to N. Also, the multiaperture technique may be used in troposcatter links employing a single reflector whenever multiple feeds can be incorporated in the antenna design. Also, in a line-of-sight system, when fading is present, the multiple apertures provide protection via space diversity.

It should be understood, of course, that the foregoing disclosure relates to only a preferred embodiment of the invention and that numerous modifications or alterations may be made therein without department from the spirit and the scope of the invention as set forth in the appended claims.

I claim:

1. A multiaperture receiving and transmitting system comprising:

transmitting means for transmitting from a plurality of spaced locations; and a plurality of receiving means each including an individual receiving aperture such that said plurality of individual receiving apertures provides an output substantially equivalent to that of a single large aperture, each receiving aperture having synthetic phase isolating means coupled thereto such that the transmitting apertures permit multiplexing of RF carriers in the same channel and each transmitted signal is received on each of the individual receiving apertures said synthetic phase isolator comprising;

means for mixing said input signals with a reference signal to produce first beat frequency signals;

means for beating each of said first beat frequency signals with its corresponding input signal to provide second beat frequency signals; and means for combining said second beat frequency signals such that the phase of said combined signal is substantially independent of the phase of said input signal.

2. A multiaperture receiving and transmitting system comprising:

N transmitters providing N transmitted signals, each of said N transmitters having an individual aperture, said transmitting apertures permitting multiplexing of RF carriers in the same channel;

N receivers for receiving said N transmitted signals each having an individual aperture of the same size said plurality of apertures providing an output substantially equivalent to that of a single large aperture; and a plurality of predetection combining means each including a synthetic phase isolating means coupled to each of said receivers for reception of each of said transmitted signals on N receiving apertures, such than an $N^2$ improvement in signal-to-noise ratio is provided;

said synthetic phase isolating means including:

means for mixing said N transmitted signals with a reference signal to produce first beat frequency signals;

means for beating each of said first beat frequency signals with its corresponding transmitted signal to provide second beat frequency signals; and means for combining said second beat frequency signals such that the phase of said combined signal is substantially independent of the phase of said transmitted signals.

3. A multiaperture receiving and transmitting system comprising:

K transmitters for providing K transmitted signals, each of said K transmitters having an individual aperture, said transmitting apertures permitting multiplexing of RF carriers in the same channel;

N receivers each having an individual aperture for receiving said K transmitted signals said plurality of apertures providing an output substantially equivalent to that of a single large aperture; and predetection combining means including a synthetic phase isolation means coupled to each of said N receivers for permitting reception of each of said transmitted signals on N receiving apertures, such than an KN improvement in signal-to-noise ratio is provided;

said synthetic phase isolation means including:

means for mixing said received signals with a reference signal to produce first beat frequency signals;

means for beating each of said first beat frequency signals with its corresponding signal to provide second beat frequency signals; and means for combining said second beat frequency signals such that the phase of said combined signal is substantially independent of the phase of said input signals.

* * * * *